US008249848B2

(12) United States Patent
Letz et al.

(10) Patent No.: US 8,249,848 B2
(45) Date of Patent: Aug. 21, 2012

(54) VERIFYING A PROCESSOR DESIGN USING A PROCESSOR SIMULATION MODEL

(75) Inventors: Stefan Letz, Boeblingen (DE); Kai Weber, Holzgerlingen (DE); Juergen Vielfort, Althengstett (DE)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 12/182,211

(22) Filed: Jul. 30, 2008

(65) Prior Publication Data

US 2009/0063829 A1    Mar. 5, 2009

(30) Foreign Application Priority Data

Sep. 5, 2007   (EP) ..................... 07115720

(51) Int. Cl.
*G06F 17/50* (2006.01)
(52) U.S. Cl. ........................................................ 703/14
(58) Field of Classification Search .................... 703/14; 712/208; 382/218
See application file for complete search history.

(56) References Cited

U.S. PATENT DOCUMENTS

| | | | | | |
|---|---|---|---|---|---|
| 4,550,436 | A | * | 10/1985 | Freeman et al. | 382/218 |
| 5,388,233 | A | * | 2/1995 | Hays et al. | 712/208 |
| 5,940,605 | A | * | 8/1999 | Aoki | 703/26 |
| 2002/0120413 | A1 | * | 8/2002 | Gooding et al. | 702/66 |
| 2004/0117172 | A1 | * | 6/2004 | Shibata | 703/22 |
| 2004/0193395 | A1 | * | 9/2004 | Paulraj | 703/22 |
| 2005/0125777 | A1 | * | 6/2005 | Calder et al. | 717/131 |
| 2005/0289396 | A1 | * | 12/2005 | Hooper et al. | 714/34 |
| 2006/0059387 | A1 | * | 3/2006 | Swoboda et al. | 714/30 |
| 2007/0038435 | A1 | * | 2/2007 | Koizumi | 703/27 |

OTHER PUBLICATIONS

J.L. Peterson et al., "Application of full-system simulation in exploratory system design and development," Mar. 2006, IBM Journal of research and Development, vol. 50, issue 2/3, pp. 321-332.*
Peter S. Magnusson et al., "Simics: a full system simulation platform," 2002, Computer, vol. 35, issue 2, pp. 50-58.*
In-Cheol Park et al., "Fast cycle-accurate behavioral simulation for pipelined processors using early pipeline evaluation," 2003, 2003 International Conference on Computer-aided Design, pp. 138-141.*
David A. Patterson et al., "Computer organization and design," third edition, 2005, Morgan Kaufmann publishers, pp. 368-449.*

* cited by examiner

*Primary Examiner* — Kandasamy Thangavelu
*Assistant Examiner* — Russ Guill
(74) *Attorney, Agent, or Firm* — The Steadman Law Firm PLLC; Cynthia seal

(57) ABSTRACT

An improved method of verifying a processor design using a processor simulation model in a simulation environment is disclosed, wherein the processor simulation model includes at least one execution unit for executing at least one instruction of a test file. The method includes tracking each execution of each of the at least one instruction, monitoring relevant signals in each simulation cycle, maintaining information about the execution of the at least one instruction, wherein the maintained information includes a determination of an execution length of a completely executed instruction, matching the maintained information about the completely executed instruction against a set of trap elements provided by the user through a trap file, and collecting the maintained information about the completely executed instruction in a monitor file in response to a match found between the maintained information and at least one of the trap elements.

15 Claims, 9 Drawing Sheets

VERIFYING A PROCESSOR DESIGN USING A PROCESSOR SIMULATION MODEL

CROSS-REFERENCE TO RELATED APPLICATIONS

This application claims priority under 35 U.S.C. §119 to European Patent Application No. 07115720.0 filed Sep. 5, 2007, the entire text of which is specifically incorporated by reference herein.

BACKGROUND OF THE INVENTION

1. Field of the Invention

The present invention relates generally to verification tools for processor designs and particularly to a method and a system for verifying a processor design using a processor simulation model in a simulation environment, wherein the processor simulation model comprises at least one execution unit for executing at least one instruction of a test file. More particularly, the present invention relates to a data processing program and a computer program product for verifying a processor design.

2. Description of the Related Art

During the design stage of processors, verification is necessary to ensure that all possible combinations of instructions and execution lengths are implemented properly and are tested by the simulation environments. The verification of the processor design relies on logic design to provide a list of all existing combinations and adds coverage events for these combinations to simulation environments and also ensures that all events are covered. However, this method requires substantial manual and error-prone work, the provided list may be incomplete or incorrect, and logic changes require the addition and/or removal of coverage events.

State-of-the-art hardware implementations of execution units, such as fixed point units (FXUs) and floating point units (FPUs), support a high number of instructions/operations. For example, a modern floating point unit (FPU) implements several hundred instructions. Each instruction can have different execution lengths, measured in cycles. For the most part, the number of cycles necessary to execute an instruction depends upon the specific input operands. Implementations may detect so-called early-out cases that do not require the execution of the complete computational algorithm. For example, multiply-by-zero and divide-by-one operations both result in well-defined values. Furthermore, hardware settings such as the setting of switches that enable or disable certain functionality and the specific circumstances of executing an instruction, such as forwarding results from previous instructions, can influence the execution length of an instruction as well. Furthermore, performance improvements of existing instruction implementations require an efficient method to track changes and their effects.

The increasingly high number of instructions supported by current execution unit implementations and their various execution lengths makes it very difficult to ensure that all possible combinations of instructions and execution lengths are implemented properly, function as intended, and are fully covered in the simulation environments.

SUMMARY OF THE INVENTION

The technical problem underlying the invention involves providing a method and a system for verifying a processor design using a processor simulation model in a simulation environment and to provide a data processing program and a computer program product to perform said method. Moreover, the technical problem involves providing an automated way to monitor execution cycles of instructions that are simulated in a simulation model and to collect information about the existing execution lengths.

The invention solves this problem by providing a method for verifying a processor design having the features of claim 1, a system for verifying a processor design having the features of claim 10, a data processing program for performing a method for verifying a processor design having the features of claim 19, and a computer program product causing a computer to perform a method for verifying a processor design having the features of claim 20. Advantageous embodiments of the invention are mentioned in the corresponding dependent claims.

Accordingly, in an exemplary embodiment of the present invention, a method for verifying a processor design using a processor simulation model in a simulation environment tracks each execution of each of at least one instruction of a test file, monitors relevant signals in each execution cycle, and maintains information about the execution of the at least one instruction, wherein the maintained information comprises a determination of an execution length of a completely executed instruction. The processor simulation model comprises at least one execution unit for executing the at least one instruction. The method for verifying matches the maintained information about the completely executed instruction against a set of trap elements provided by the user through a trap file and collects the maintained information about the completely executed instruction in a monitor file in response to a match found between said maintained information and at least one of said trap elements.

The trap functionality of the monitor permits a user to obtain a collection of interesting test cases for coverage purposes. For instance, the trap functionality permits a user to easily cover specific cases in a static regression and to use these test cases when verifying existing implementations and when implementing and testing changes, such as performance enhancements.

In another exemplary embodiment of the present invention, the method for verifying a processor design collects the maintained information about the completely executed instruction in a statistic file. That is to say, information of each complete execution of an instruction is added to this statistic file.

The monitor file and statistics file enable the user to maintain a table of the collected execution cases of instructions, which can be used by driver and checker code in the simulation environments to ensure that all known cases are actually being covered by the simulation environments, i.e., are generated by the test generators and supported by the drivers; to compare and verify design data and statistics, and to investigate discrepancies; to investigate and track the effects of performance enhancements of instructions; to implement and track further performance enhancements; and to better predict the performance of the execution unit and the overall processor design.

In another exemplary embodiment of the present invention, tracking each execution of each of the at least one instruction comprises creating a monitor queue with a queue element for each instruction currently being executed, wherein each queue element contains an instruction identifier, which identifies the type of the corresponding instruction, and also contains an execution cycle counter, which holds a counter value indicating the number of execution cycles that the corresponding instruction has executed up to the current point in time. In each simulation cycle, the queue elements and the monitor queue are modified in response to the states of the relevant signals that are monitored and that comprise at least one of an instruction issue valid signal, an instruction stall signal, an instruction kill/flush signal, and an end of instruction signal.

In another exemplary embodiment of the present invention, the counter values of the execution cycle counters of the queue elements are increased in response to each execution cycle during the execution of the corresponding instructions.

In another exemplary embodiment of the present invention, the method for verifying a processor design further comprises creating a new queue element in response to the instruction issue valid signal being active and representing information about a starting point of the execution of the at least one instruction; holding current counter values of the execution cycle counters of the queue elements in response to the instruction stall signal being active; removing corresponding queue elements from the monitor queue in response to the instruction kill/flush signal being active; and removing the oldest queue element from the monitor queue, whereas this queue element comprises an instruction identifier and a number of execution cycles representing the execution length of the corresponding completed instruction, and matches the maintained information of the oldest queue element against the set of trap elements in response to the end of instruction signal being active and representing information about an ending point of the execution of the at least one instruction.

In another exemplary embodiment of the present invention, the step of collecting the information about a completely executed instruction in the monitor file comprises creating a monitor case that includes the oldest queue element and the current test case of the test file (the current test case consisting of the instruction identifier of the completely executed instruction and corresponding input data), and sending the monitor case to the monitor file.

In another exemplary embodiment of the present invention, the step of collecting the information about a completely executed instruction in the statistic file comprises creating a statistic case that includes the oldest queue element and sending the statistic case to the statistic file, wherein the occurrence of the received statistic case type is counted and the number of occurrences is added to the statistic case.

In another exemplary embodiment of the present invention, each trap element comprises at least one of an instruction identifier and a placeholder, and also a regular expression which is either empty or comprises at least one of a relational operator, a number of execution cycles, and a logical operator.

In another exemplary embodiment of the present invention, a system for verifying a processor design using a processor simulation model in a simulation environment comprises a monitor unit including a control unit and using an interface to communicate with the processor simulation model. The processor simulation model comprises at least one execution unit for executing at least one instruction of a test file. The monitor unit is configured to track each execution of each of the at least one instruction; to monitor relevant signals in each simulation cycle; to maintain information about the execution of the at least one instruction, wherein said maintained information comprises a determination of an execution length of a completely executed instruction; to match the maintained information about the completely executed instruction against a set of trap elements provided by the user through a trap file; and to collect the maintained information about the completely executed instruction in a monitor file in response to a match found between the maintained information and at least one of the trap elements.

In another exemplary embodiment of the present invention, the monitor unit is further configured to collect the maintained information about a completely executed instruction in a statistic file. Additionally, the monitor unit is further configured to create a monitor queue with a queue element for each instruction currently being executed by the at least one execution unit.

In another exemplary embodiment of the present invention, each queue element of the monitor queue is configured to comprise an instruction identifier, which identifies the type of instruction, and an execution cycle counter, which holds a counter value indicating the number of execution cycles that the corresponding instruction has executed up to the current point in time. The monitor unit is further configured to modify the queue elements and the monitor queue in each simulation cycle in response to the relevant signals that comprise at least one of an instruction issue valid signal, an instruction stall signal, an instruction kill/flush signal, and an end of instruction signal.

In another exemplary embodiment of the present invention, the execution cycle counters are configured to increase their counter values in response to each execution cycle during the execution of the corresponding instructions.

In another exemplary embodiment of the present invention, the monitor unit is further configured to create a new queue element in response to the instruction issue valid signal being active; to hold current counter values of said execution cycle counters in response to said instruction stall signal being active; to remove corresponding queue elements from the monitor queue in response to the instruction kill/flush signal being active; to remove the oldest queue element from the monitor queue, whereas the queue element comprises an instruction identifier and a number of execution cycles representing the execution length of the corresponding instruction; and to match the information of the oldest queue element against the set of trap elements using a comparator in response to the end of instruction signal being active.

In another exemplary embodiment of the present invention, the monitor unit is further configured to create a monitor case comprising the oldest queue element and the current test case of the test file and to send the monitor case to the monitor file. Additionally, the monitor unit is further configured to create a statistic case comprising the oldest queue element and to send the statistic case to a statistic file.

In another exemplary embodiment of the present invention, a data processing program for execution in a data processing system comprises software code portions for performing the method for verifying a processor design when said program is run on said data processing system.

In another exemplary embodiment of the present invention, a computer program product stored on a computer-usable medium causes a computer to perform the method for verifying a processor design when said program is run on said computer.

The disclosed embodiments of the invention provide an automated way to monitor execution cycles of instructions that are executed in a processor simulation model, to collect test cases that contain certain instructions with certain execution lengths, and to collect statistical data about all existing execution lengths of instructions executed during the simulation.

In sum, embodiments of the invention disclosed herein provide a manageable, automated way to efficiently handle the complexity caused by the increasingly large number of instructions implemented in execution units and their various execution lengths.

The above, as well as additional purposes, features, and advantages of the present invention will become apparent in the following detailed written description.

BRIEF DESCRIPTION OF THE DRAWINGS

An exemplary embodiment of the invention, as described in detail below, is shown in the drawings, in which.

DETAILED DESCRIPTION

Figure 1:
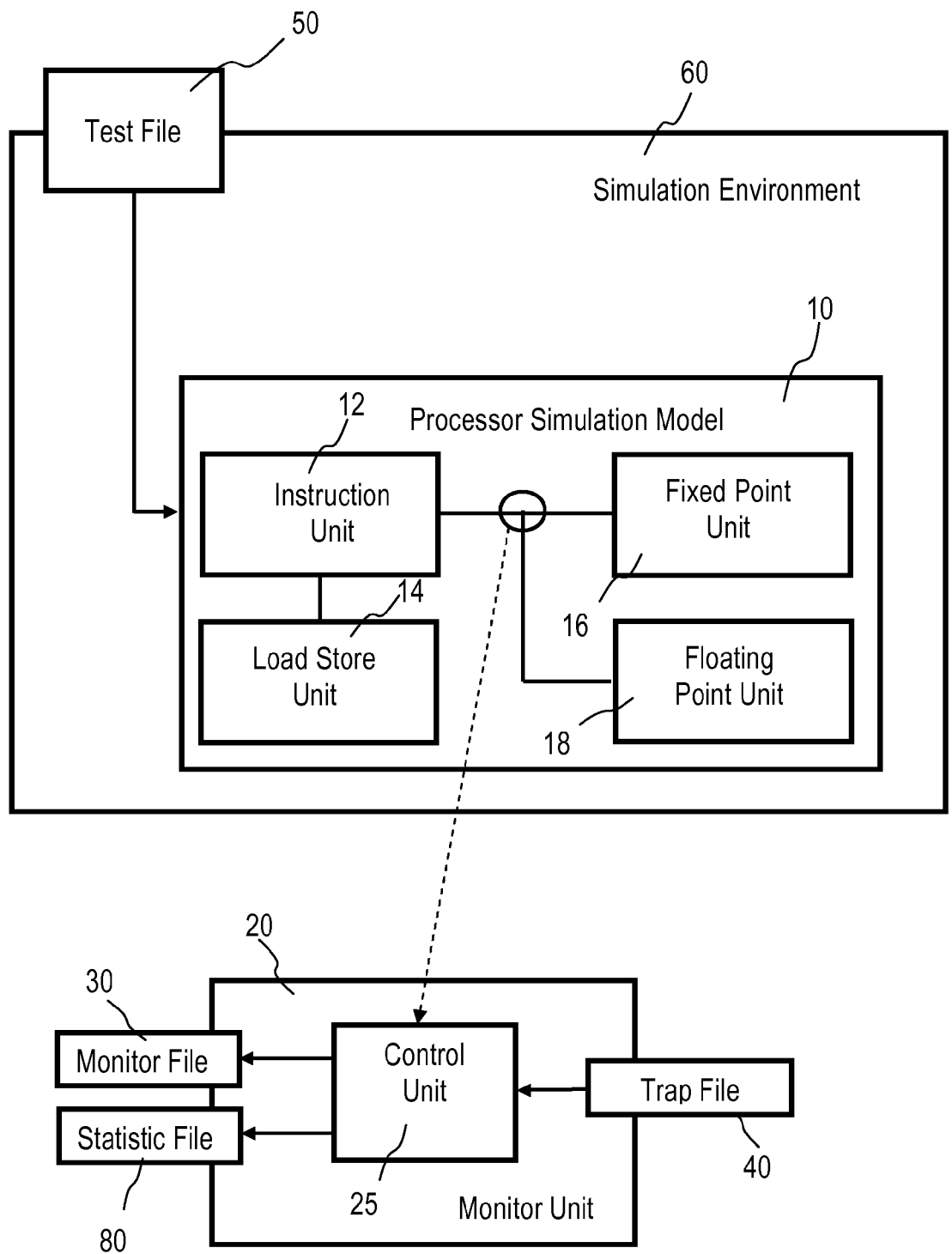
FIG. 1 is a schematic block diagram of a simulation environment with a processor simulation model and a monitor unit, in accordance with an exemplary embodiment of the present invention.

FIG. 1 shows a schematic block diagram of a simulation environment 60 with a processor simulation model 10 and a monitor unit 20, in accordance with an exemplary embodiment of the present invention.

Referring to FIG. 1, the shown embodiment of the invention employs a monitor to track instructions executed in a simulation model of a processor or in a simulation model of a part of a processor containing at least one execution unit. FIG. 1 illustrates a scenario where a monitor unit 20 tracks instructions which are given from a test file 50, interpreted by an instruction unit 12 using a load store unit 14, and executed in a fixed point unit 16 or in a floating point unit 18 contained in the larger processor simulation model 10. To track instructions, the monitor unit comprises a control unit 25 and uses an interface 62 provided by the simulation environment 60 as shown in FIG. 2 to monitor relevant signals of the processor simulation model 10.

Figure 2:
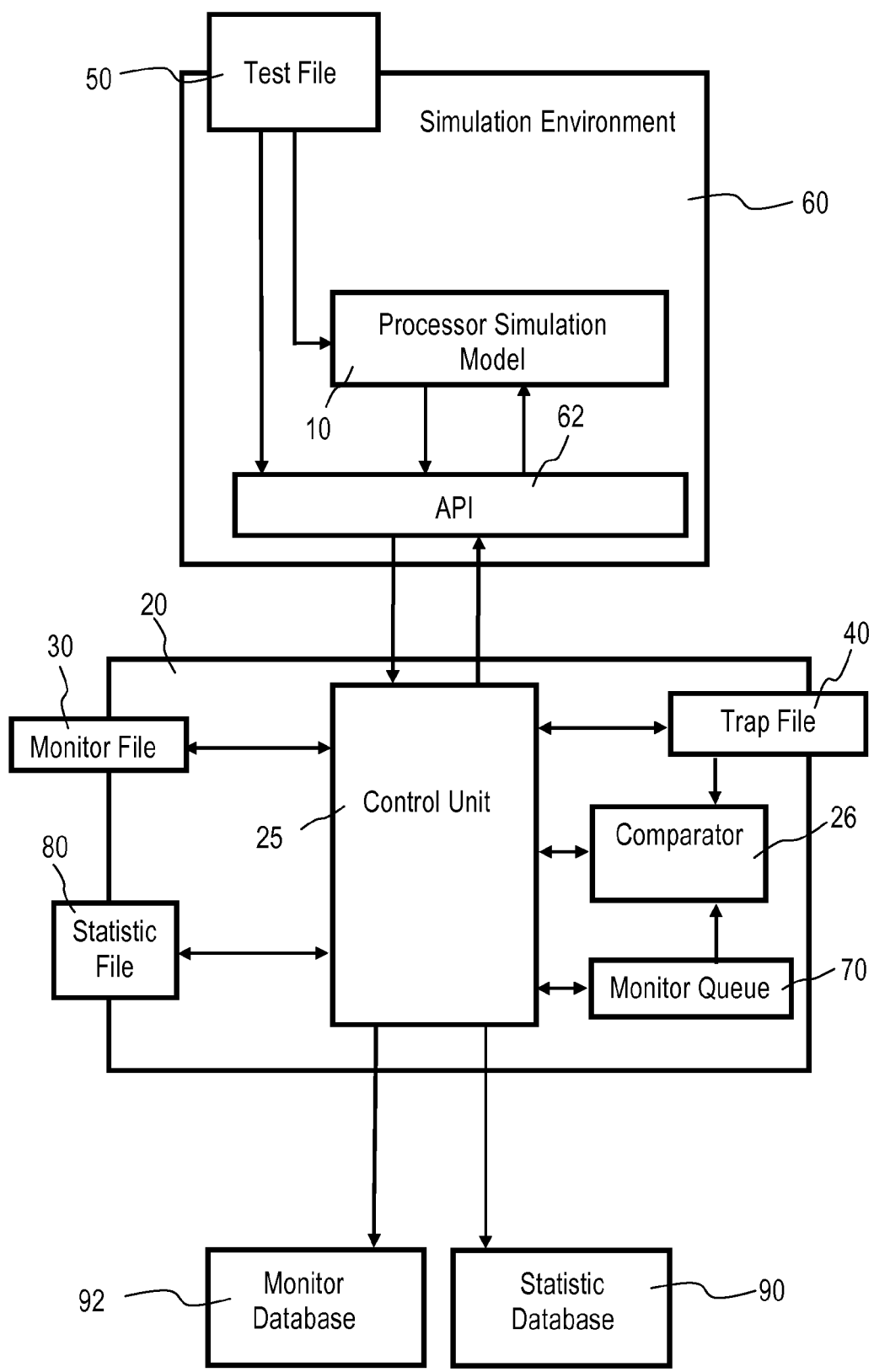
FIG. 2 is a block diagram of a simulation environment and a monitor unit, in accordance with an exemplary embodiment of the present invention.

FIG. 2 is a block diagram of the simulation environment 60 and a more detailed block diagram of the monitor unit 20, in accordance with an exemplary embodiment of the present invention.

The monitor unit 20 is designed and implemented according to the interface specifications of the relevant execution units 16, 18. It hooks into the simulation environment 60, attaches itself to specific signals in the processor simulation model 10, and monitors these signals in order to track instructions in the relevant execution units 16, 18. The signals that are monitored are chosen in a way that each possible execution of an instruction can be tracked. The relevant signals comprise at least one of an instruction issue valid signal, an instruction stall signal, an instruction kill/flush signal, and an end of instruction signal. The instruction issue valid signal signals the corresponding execution unit 16, 18 to start executing the given instruction and comes either from another unit in the processor simulation model 10 or from a driver in the simulation environment 60. The instruction issue valid signal usually contains information about the instruction, such as a unique operation code ("op code"). The instruction stall signal usually signals the corresponding execution unit 16, 18 that data from memory referenced by the instruction is not readily available and stalls the execution for a certain number of cycles. The instruction kill/flush signal signals the corresponding execution unit 16, 18 that the instruction or a group of instructions must not complete and aborts the execution of the instruction(s). The end of instruction signal signals that the corresponding execution unit 16, 18 has finished executing the instruction.

In a pipelined execution unit, multiple instructions may be executed at the same point in time. The monitor unit 20 has to correlate the interface signals with the proper instruction in order to interpret them correctly.

Figure 3:
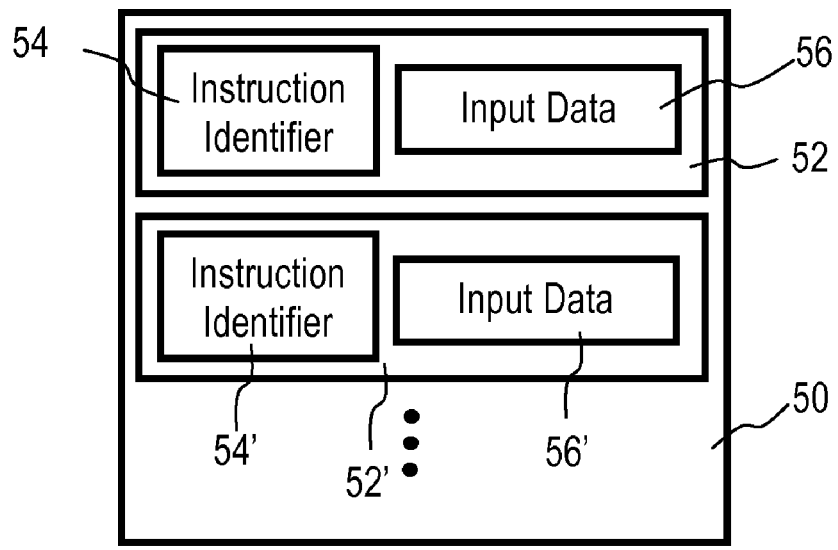
FIG. 3 is a block diagram of a test file, in accordance with an exemplary embodiment of the present invention.

During a simulation run, the monitor unit 20 tracks each instruction execution and maintains information about the execution length of each instruction, measured in execution cycles. Each completely executed instruction is matched against a set of filters, "trap elements," provided by the user through a "trap file" 40. The trap elements represent certain user-defined test cases. If the information of a completely executed instruction matches at least one of these trap elements, the current test case is collected, i.e., "trapped". For example, the monitor unit 20 can cause the simulation environment 60 to read out information about the currently executing test case of the test file 50. The test file 50 is shown in detail in FIG. 3 and contains at least one test case 52, 52'. Each test case 52, 52' comprises an instruction identifier 54, 54', which identifies the type of instruction, and input data 56, 56'. The test file 50 can use either the operation code of the corresponding instruction or the mnemonic, which can be converted from the operation code using a lookup table.

The monitor unit 20 collects the corresponding test case information together with the information about the completely executed instruction into a monitor file 30 and/or sends this information to a monitor database 92, thus allowing further processing and exploitation of the collected information.

Furthermore, the monitor unit 20 stores statistical data about the completely executed instructions, i.e., how often which instruction took a certain number of cycles to execute, into a statistic file 80 and/or sends this information to a statistic database 90. This allows the user to further process this data and to select cases for trapping. The collected monitor cases and statistics enable the user to maintain a table of the collected execution cases of instructions, which can be used by driver and checker code in the simulation environments 60 to ensure that all known test cases are actually being covered by the simulation environments 60 (i.e., to ensure that all known test cases are generated by the test generators and supported by the drivers); to compare and verify design data and statistics, to investigate discrepancies, and to investigate and track the effects of performance enhancements of instructions; to implement and track further performance enhancements; and to better predict performance of the execution units 16, 18 and the overall processor design.

Figure 4:
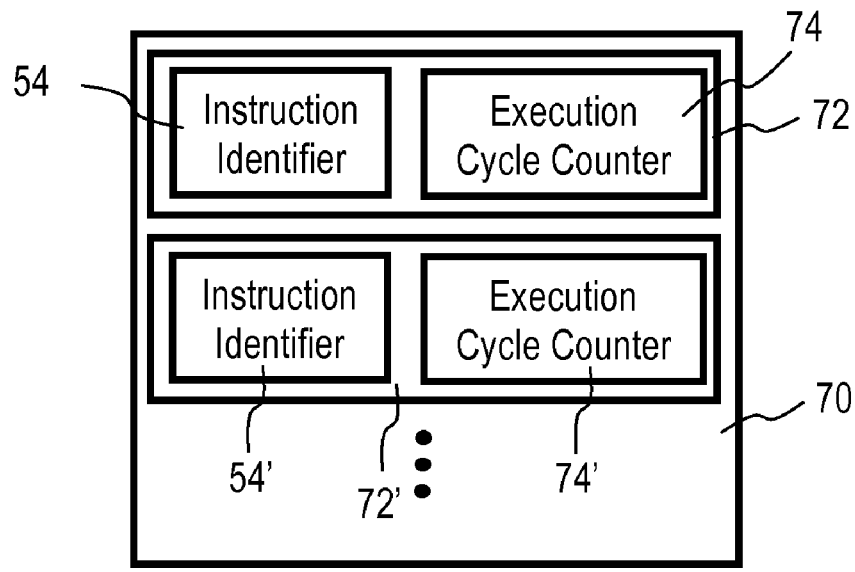
FIG. 4 is a block diagram of a monitor queue, in accordance with an exemplary embodiment of the present invention.

The monitor unit 20 is further configured to create a monitor queue 70 with a queue element 72, 72' for each instruction currently being executed by the corresponding execution unit 16, 18. The monitor queue 70 is shown in detail in FIG. 4 and contains at least one queue element 72, 72'. Each queue element 72, 72' comprises an instruction identifier 54, 54', which identifies the type of instruction, and an execution cycle counter 74, 74', which holds a counter value indicating the number of execution cycles that the corresponding instruction has executed up to the current point in time. The execution cycle counters 74, 74' are configured to increase their counter values in response to each execution cycle during the execution of the corresponding instructions. The monitor queue 70 can use either the operation code of the corresponding instruction or the mnemonic, which can be converted from the operation code using a lookup table.

The monitor unit 20 is further configured to modify the queue elements 72, 72' and said monitor queue 70 in each simulation cycle in response to the relevant signals, which comprise at least one of the instruction issue valid signal, the instruction stall signal, the instruction kill/flush signal, and the end of instruction signal. The monitor unit 20 is configured to create a new queue element in response to the instruction issue valid signal being active; to hold current counter values of the execution cycle counters 74, 74' in response to the instruction stall signal being active; to remove corresponding queue elements 72, 72' from the monitor queue 70 in response to the instruction kill/flush signal being active; and to remove the oldest queue element 72 (which comprises an instruction identifier 54 and a number of execution cycles representing the execution length of the corresponding instruction) from the monitor queue 70 and to match the information of the oldest queue element 72 against the set of trap elements 41, 41' using a comparator 26 in response to the end of instruction signal being active.

Figure 5:
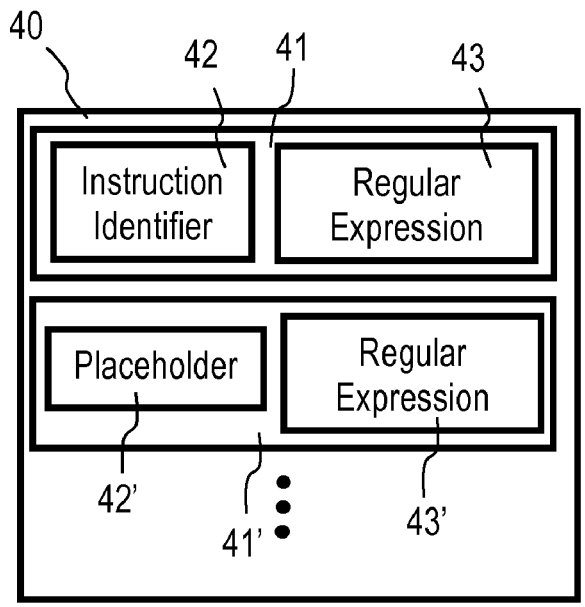
FIG. 5 is a block diagram of a trap file, in accordance with an exemplary embodiment of the present invention.
Figure 6:
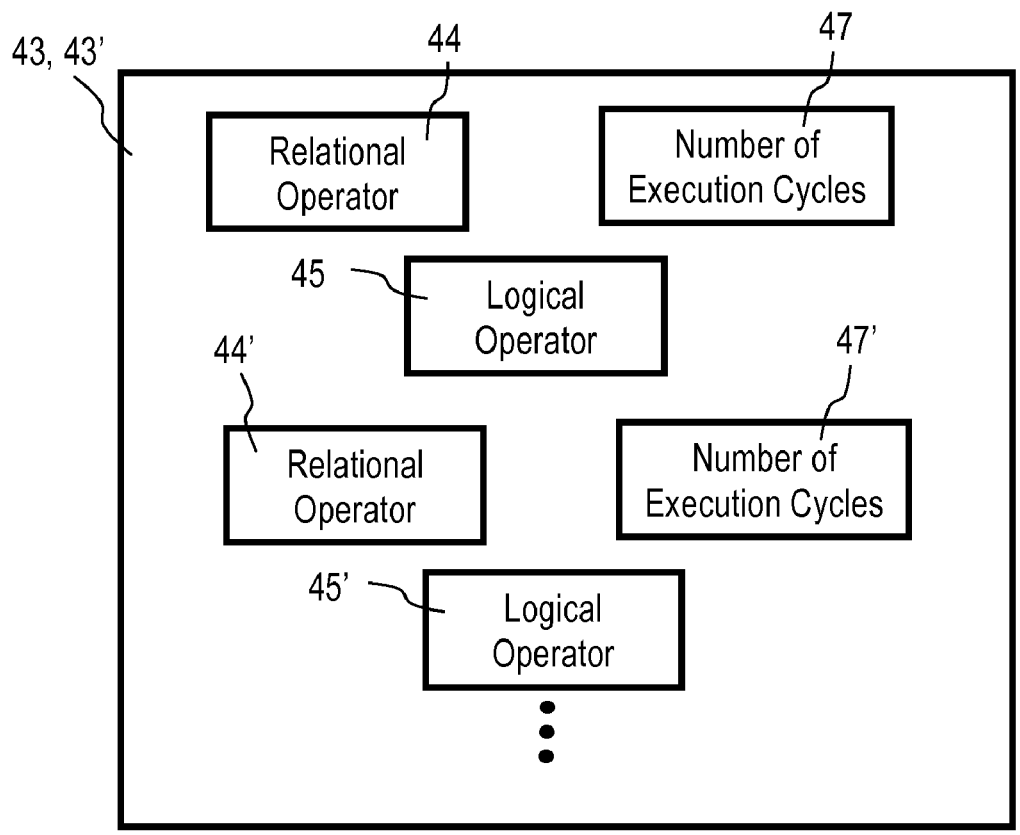
FIG. 6 is a block diagram of a regular expression, in accordance with an exemplary embodiment of the present invention.

The trap file 40 is shown in detail in FIGS. 5 and 6. It contains at least one trap element 41, 41', whereas each trap element 41, 41' comprises either an instruction identifier 42 or a placeholder 42', and also a regular expression 43, 43'.

The cases in which the monitor unit should trap the current test case 52, 52' are specified as a list of trap elements 41, 41'. When an instruction is completely executed in the processor simulation model 10, the monitor unit 20 compares its information about the instruction and the determined execution length of the instruction with all trap elements 41, 41' using the comparator 26. If at least one trap element 41, 41' matches, the current test case 52, 52' is trapped. As referred to above, each trap element 41, 41' consists either of an information about the instruction identifier 42 (which is a numerical operation code or an alphanumeric mnemonic) or a placeholder 42', and also a regular expression 43, 43'. The regular expression 43, 43' is either empty (don't care) or contains at least one relational operator 44, 44' (e.g., equal, not equal, less than, greater than, equal or less than, equal or greater than, etc.) and a corresponding number of execution cycles 47, 47'. Logical operators 45, 45' combine the relational operators 44, 44' and the corresponding numbers of execution cycles 47, 47'. That is to say, the first logical operator 45 combines the first relational operator 44 and the first number of execution cycles 47 with the second relational operator 44' and the second number of execution cycles 47', and so forth.

The trap file 40 is not necessarily an actual file in a file system; it can also be represented in other kinds of data structures (e.g., a database). There can be multiple trap elements 41, 41' for any instruction identifier 42 and for any placeholder 42'.

Table 1 shows some exemplary trap elements 41, 41'. The first trap element matches for every execution of an instruction ADD with an execution length of 10 cycles. Likewise, the second trap element matches for every execution of an instruction SUB with less than 20 cycles. The third trap element matches for every execution of the instruction DIV. The fourth trap element matches for any instruction with an execution length of at least 35 cycles. The fifth trap element matches for an instruction MADD with an execution length between 45 and 55 cycles. The sixth trap element matches for an instruction SQRT with more than 60 or less than 10 cycles.

TABLE 1

| Instruction identifier | Regular expression |
|---|---|
| ADD | =10 |
| SUB | <20 |
| DIV | |
| * | >=35 |
| MADD | >=45 AND <=55 |
| SQRT | >60 OR <10 |

Below is a set of rules that defines the structure of the regular expressions used in the examples above. The left side of the set contains placeholders which are used for the items on the right side of the set. The symbol | designates alternatives. Space+ signifies one or more occurrences of symbol Space. Number+ signifies one or more occurrences of symbol Number.

| | | |
|---|---|---|
| RegularExpression | := | FilterCondition |
| FilterCondition | := | RelationalOperator NumberCycles \| FilterCondition Space+ LogicalOperator Space+ FilterCondition |
| RelationalOperator | := | = \| < > \| < \| > \| <= \| >= |
| NumberCycles | := | Number+ |
| Number | := | 0 \| 1 \| 2 \| 3 \| 4 \| 5 \| 6 \| 7 \| 8 \| 9 |
| LogicalOperator | := | AND \| OR |
| Space | := | ' ' |

Figure 7:
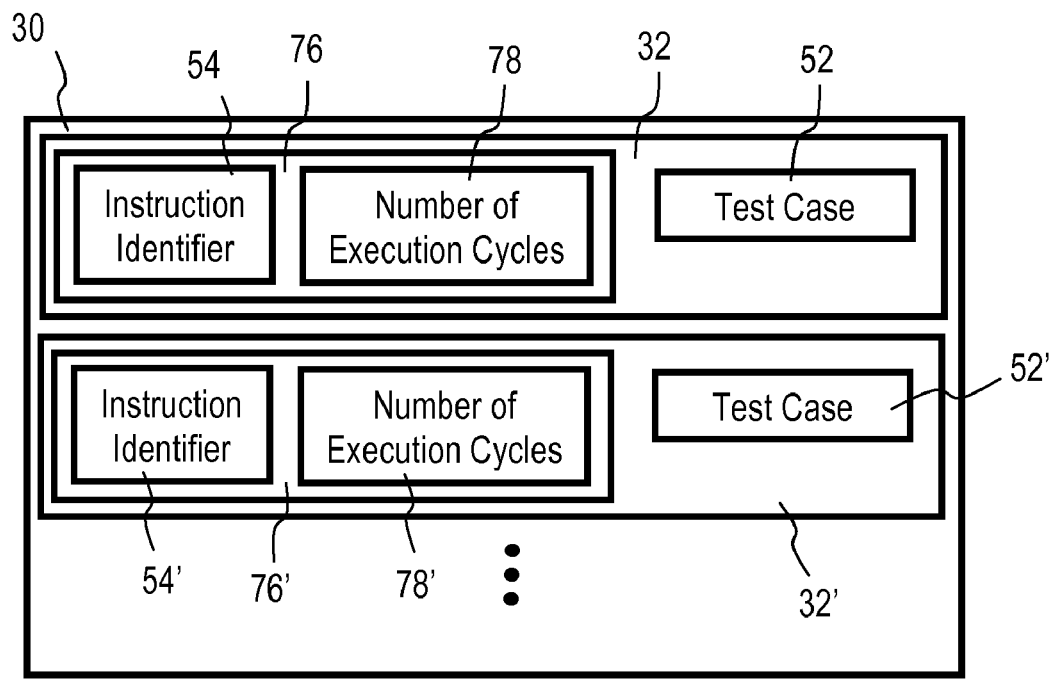
FIG. 7 is a block diagram of a monitor file, in accordance with an exemplary embodiment of the present invention.

The monitor file 30 is shown in detail in FIG. 7 and contains monitor cases 32, 32' created by the monitor unit 20. Each monitor case 32, 32' consists of the oldest queue element 76, 76' that was removed from the monitor queue 70 in response to the end of instruction signal and the corresponding current test case 52, 52' of the test file 50. Each oldest queue element 76, 76' comprises an instruction identifier 54, 54' and a corresponding number of execution cycles 78, 78'.

Figure 8:
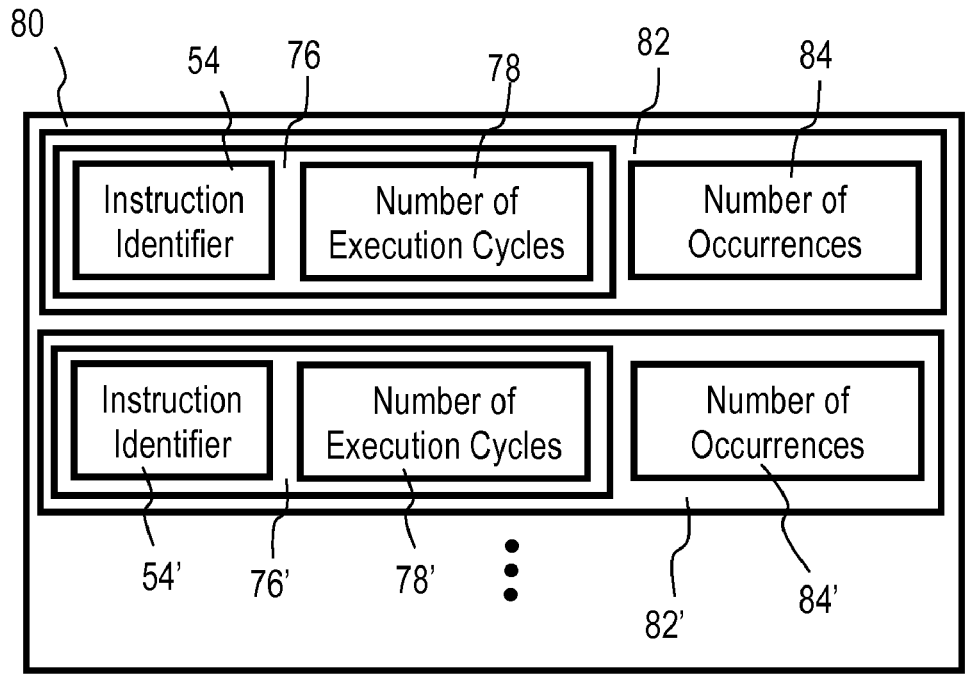
FIG. 8 is a block diagram of a statistic file, in accordance with an exemplary embodiment of the present invention.

The statistic file 80 is shown in detail in FIG. 8 and contains statistic cases 82, 82' created by the monitor unit 20. Each statistic case 82, 82' consists of the oldest queue element 76, 76' that was removed from the monitor queue 70 in response to the end of instruction signal and a number of occurrences 84, 84' of the corresponding oldest queue element 76, 76'. Each oldest queue element 76, 76' comprises an instruction identifier 54, 54' and a corresponding number of execution cycles 78, 78'. The statistic cases 82, 82' contained in the statistic file 80 can be sent to the statistic database 90.

Figure 9:
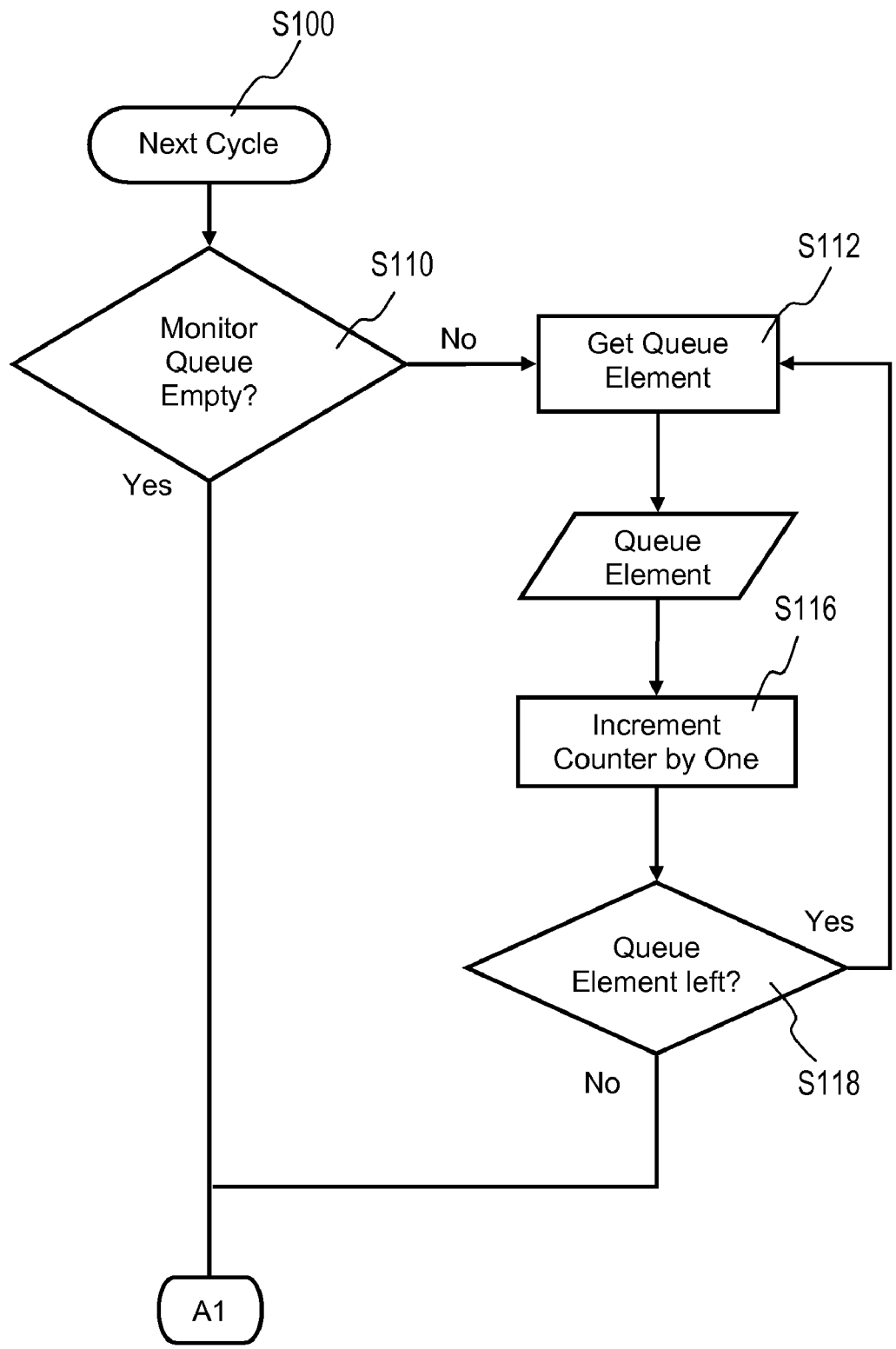
FIG. 9 to 11 each contain a portion of a flow chart of a method for verifying a processor design, in accordance with an exemplary embodiment of the present invention.
Figure 10:
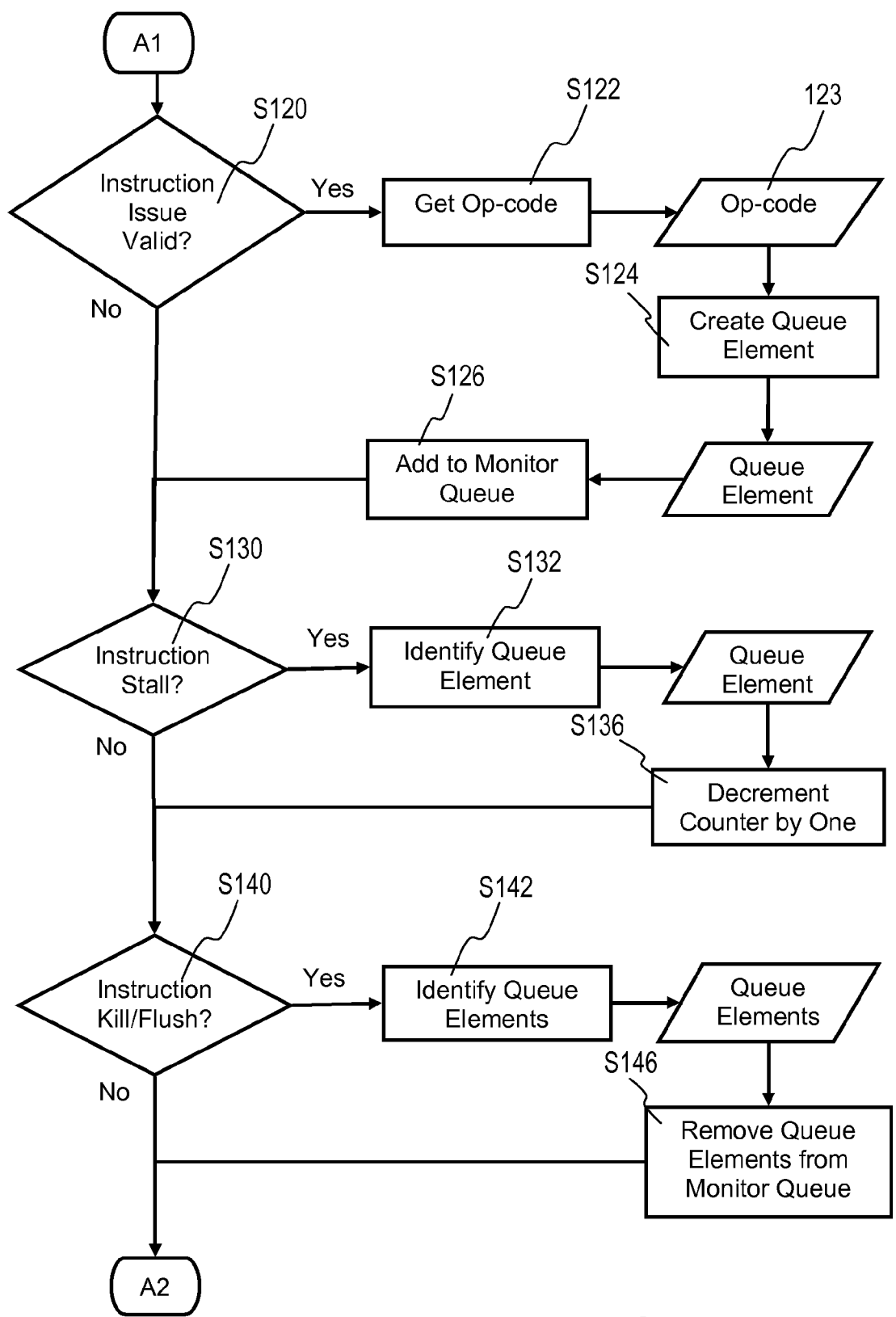
Figure 11:
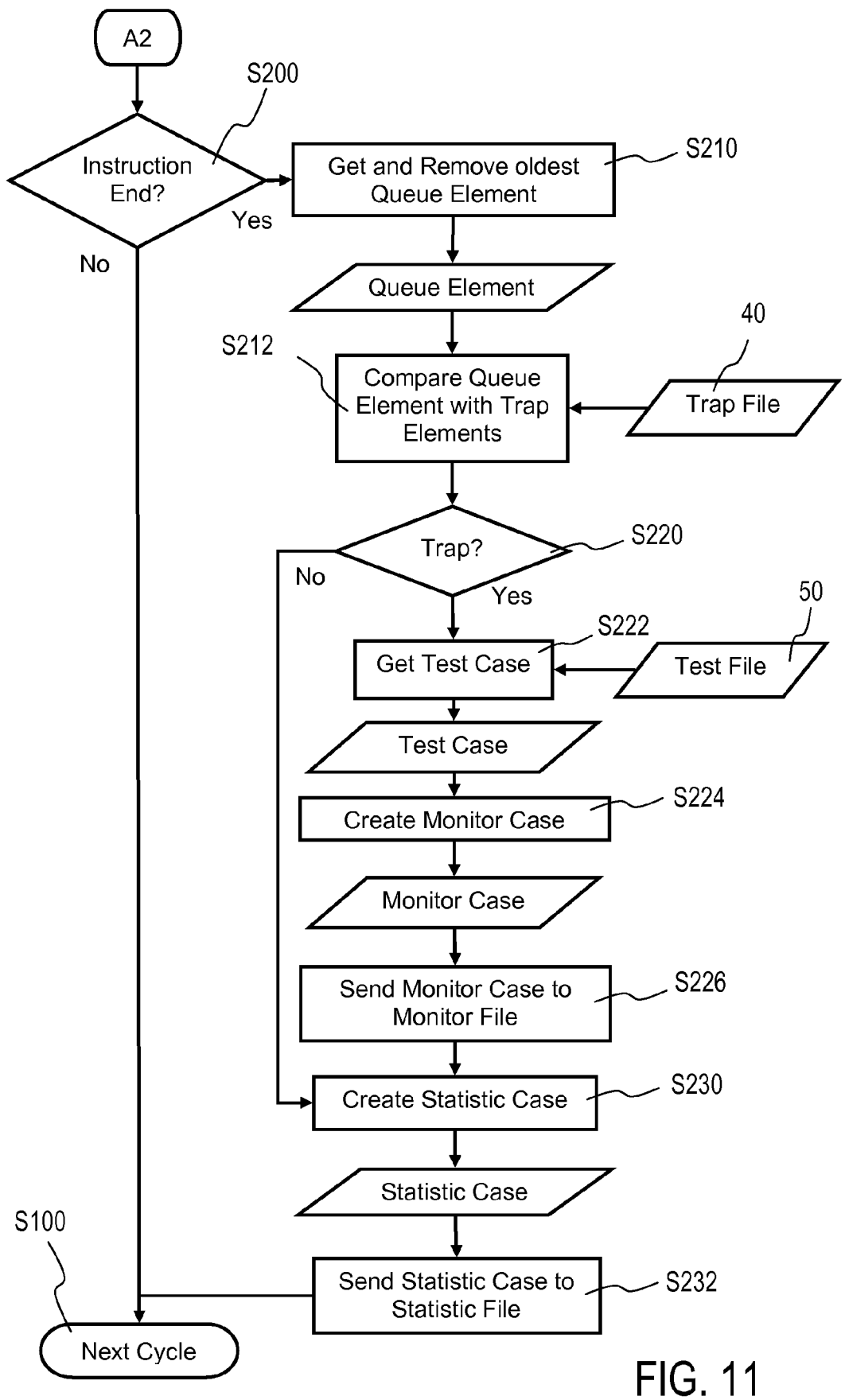
Figure 12:
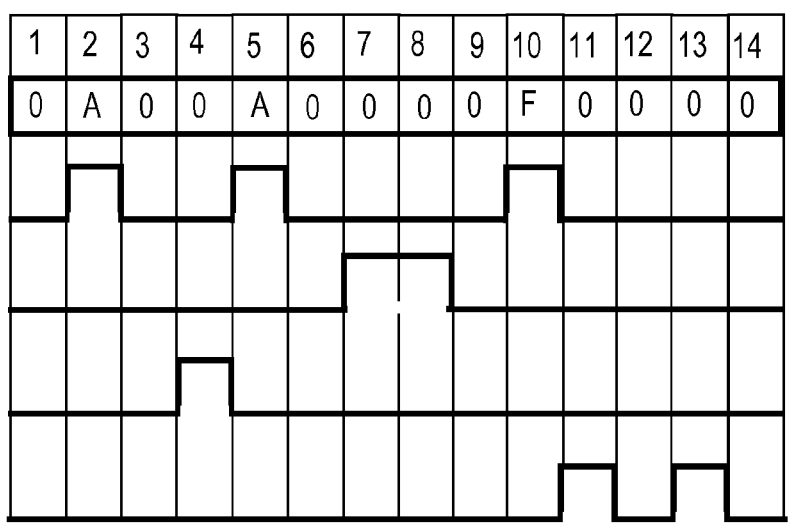
FIG. 12 is a timing diagram of signals produced during a simulation run of a simulation environment, in accordance with an exemplary embodiment of the present invention.

With reference to FIG. 9 to 11, which show a high-level flowchart, and to FIG. 12, which shows a timing diagram of signals produced during a simulation run of a simulation environment 60, an exemplary method for verifying a processor design according to embodiments of the present invention is explained.

For the following example, it is assumed that the monitor unit 20 monitors the instruction issue valid signal, which signals the corresponding execution unit 18 that it must begin executing the instruction identified by an operation code (opcode); the instruction stall signal, which signals the corresponding execution unit 18 to stop executing the instruction that is in a certain pipeline stage of the execution unit 18; the instruction kill/flush signal, which signals the corresponding execution unit 18 to kill all instructions that are currently being executed; and the end of instruction signal, which signals the instruction unit 12 that the corresponding execution unit 18 has finished executing an instruction.

It is further assumed that the monitor unit 20 is given the trap file 40 shown in Table 2.

TABLE 2

| Instruction mnemonic | Regular expression |
|---|---|
| ADD | =4 |
| SUB | <3 |
| * | >=10 |

The first trap element matches for an instruction ADD with four execution cycles. The second trap element matches for an instruction SUB with less than three execution cycles. The third trap element matches for any instruction with at least ten execution cycles. Specifically, the first trap element represents a certain test case with an instruction ADD with four execution cycles that the monitor unit 20 must collect in the monitor file 30. The second trap element represents a first test case with an instruction SUB with one execution cycle and a second test case with an instruction SUB with two execution cycles that the monitor unit 20 must collect in the monitor file 30. The third trap element represents an infinite number of test cases that consist of instructions with at least ten execution cycles.

As indicated in FIG. 12, in a first simulation cycle 1, the monitor unit 20 initializes and reads the trap file 40. There are no instructions in the corresponding execution unit 18 and no queue elements in the monitor queue 70. Specifically, as illustrated in FIG. 9, the next cycle, which in this case is the first simulation cycle 1, is identified in step S100. In the context of the method steps illustrated in FIGS. 9 to 11, there is no relevant interface activity in the first simulation cycle 1, since all relevant signals are on a low logic level. Thus, in the first simulation cycle 1, the condition of step S110 is true, and the conditions of steps S120, S130, S140, and S200 are all false.

In a second simulation cycle 2, a first instruction ADD with a first operation code 0xA is issued to the execution unit 18. The monitor unit 20 adds a first queue element to the monitor queue 70 during steps S120 to S126, since the condition of step S120 is true because the instruction issue valid signal is on a high logic level. More specifically, the monitor unit 20 gets an op-code 123 in step S122 and creates the first queue element comprising the op-code and a first execution cycle counter with an initial counter value of zero in step S124. After the second simulation cycle 2, the first instruction ADD is in the execution unit 18 and the first queue element with the first op-code 0xA and a first counter value of 0 is held in the monitor queue 70.

In a third simulation cycle 3, there is no relevant interface activity since all relevant signals are on a low logic level. The monitor unit 20 increments the first execution cycle counter of the first queue element according to the steps S110 to S118, since the condition of step S110 is not true. More specifically, since the condition of step S110 is not true, the monitor unit 20 gets the first queue element in step S112 and increments the execution cycle counter of the first queue element in step S116. After the third simulation cycle, the first instruction ADD is still in the execution unit 18 and the first queue element in the monitor queue 70 is modified, and thus the first queue element comprises the first op-code 0xA and a new first counter value of 1.

In a fourth simulation cycle 4, all instructions in the execution unit 18 are flushed and the monitor unit 20 removes all queue elements according to the steps S140 to S146, since the condition of step S140 is true because the instruction kill/flush signal is on a high logic level. Specifically, the monitor unit 20 identifies the queue elements of the monitor queue 70 in step S142 and removes these queue elements from the monitor queue 70 in step S146. Thus, in the fourth simulation cycle 4, the first instruction ADD in the execution unit 18 is flushed, the monitor queue 70 is modified, and the first queue element is removed from the monitor queue 70.

In a fifth simulation cycle 5, a new first instruction ADD with a first op-code 0xA is issued to the execution unit 18. The monitor unit 20 adds a new first queue element to the monitor queue 70 during steps S120 to S126, since the condition of step S120 is true because the instruction issue valid signal is on a high logic level. After the fifth simulation cycle 5, the new first instruction ADD is in the execution unit 18, and a new first queue element with a new first op-code 0xA and a new first counter value of 0 is in the monitor queue 70.

In a sixth simulation cycle 6, there is no relevant interface activity since all relevant signals are on a low logic level. The monitor unit 20 increments the first execution cycle counter of the first queue element according to the steps S110 to S118, since the condition of step S110 is not true. After the sixth simulation cycle 6, the first instruction ADD is still in the execution unit 18 and the first queue element in the monitor queue 70 is modified, and thus the first queue element comprises the first op-code 0xA and the new first counter value of 1.

In a seventh simulation cycle 7, the first instruction ADD in the execution unit 18 is stalled, since the condition of step S130 is true because the instruction stall signal is on a high logic level. The monitor unit 20 increments the first execution cycle counter of the first queue element according to the steps S110 to S118, since the condition of step S110 is not true. Subsequently, the monitor unit 20 decrements the first execution cycle counter of the first queue element according to the steps S130 to S136, so that the first queue element in the monitor queue 70 is not modified. Specifically, upon determining an instruction stall in step S130, the monitor unit 20 identifies the first queue element having the first op-code 0xA in step S132. Subsequently, the monitor unit 20 decrements by one the first execution cycle counter of the first queue element in step S136. The first queue element still comprises the first op-code 0xA and the former first counter value of 1.

In an eighth simulation cycle 8, the instruction ADD in the execution unit 18 is stalled for one more execution cycle, since the condition of step S130 is true because the instruction stall signal is still on a high logic level. Thus, the monitor unit 20 increments the first execution cycle counter of the first queue element according to the steps S110 to S118 and decrements the first execution cycle counter of the first queue element according to the steps S130 to S136, so that the first queue element in the monitor queue 70 is still not modified. The first queue element still comprises the first op-code 0xA and the former first counter value of 1.

In a ninth simulation cycle 9, there is no relevant interface activity since all relevant signals are on a low logic level. The monitor unit 20 increments the execution cycle counter of the first queue element according to the steps S110 to S118, since the condition of step S110 is not true. After the ninth simulation cycle 9, the first instruction ADD is still in the execution unit 18 and the first queue element in the monitor queue 70 is modified, and thus the first queue element comprises the first op-code 0xA and the new first counter value of 2.

In a tenth simulation cycle 10, a second instruction SUB with a second op-code 0xF is issued to the execution unit 18. The monitor unit 20 increments the first execution cycle counter of the first queue element according to the steps S110 to S118, since the condition of step S110 is not true. Moreover, the monitor unit 20 adds a second queue element to the monitor queue 70 during step S120 to S126, since the condition of step S120 is true because the instruction issue valid signal is on a high logic level. After the tenth simulation cycle 10, the first instruction ADD and the second instruction SUB are in the execution unit 18. The first queue element in the monitor queue 70 is modified so that the first queue element comprises the first op-code 0xA and the new first counter value of 3. In addition, the second queue element with the second op-code 0xF and a second counter value of 0 is added to the monitor queue 70.

In an eleventh simulation cycle 11, the execution unit 18 completes the first instruction ADD. The monitor unit 20 increments the execution cycle counters of the first queue element and the second queue element according to the steps S110 to S118, since the condition of step S110 is not true. Thus, the first execution cycle counter holds the new first counter value of 4 and the second execution cycle counter holds the new second counter value of 1. Since the condition of step S200 is true because the end of instruction signal is on a high logic level, the monitor unit 20 removes the oldest queue element, i.e., the first queue element, from the monitor queue 70 in step S210 and compares the first queue element with the trap elements of the trap file 50 in step S212. In step S220, the monitor unit 20 determines whether the first queue element matches with any trap element based on the comparison in step S212. Since the first queue element matches with the first trap element of table 2, in step S220 the monitor unit 20 determines that the matching result of step S212 is true. As a result, the monitor unit 20 gets the current test case from the test file 50 in step S222, creates a first monitor case in step S224, and sends the first monitor case to the monitor file 30 in step S226. In step S230, the monitor unit 20 creates a first statistic case and sends the first statistic case to the statistic file 80 in step S232. Thus, after the eleventh simulation cycle 11, the first instruction ADD is removed from the execution unit 18 and the second instruction SUB is still in the execution unit 18. The second queue element in the monitor queue 70 is modified so that the second queue element comprises the second op-code 0xF and the new second counter value of 1. In sum, in the eleventh simulation cycle 11, the first queue element with the first op-code 0xA and the new first counter value of 4 is removed from the monitor queue 70 and combined with the current test case from the test file 50 to create the first monitor case.

In a twelfth simulation cycle 12, there is no relevant interface activity since all relevant signals are on a low logic level. The monitor unit 20 increments the second execution cycle counter of the second queue element according to the steps S110 to S118, since the condition of step S110 is not true. After the twelfth simulation cycle 12, the second instruction SUB is still in the execution unit 18. The second queue element in the monitor queue 70 is modified so that the second queue element comprises the second op-code 0xF and the new second counter value of 2.

In a thirteenth simulation cycle 13, the execution unit 18 completes the second instruction SUB. The monitor unit 20 increments the execution cycle counter of the second queue element according to the steps S110 to S118, since the condition of step S110 is not true. Accordingly, the second execution cycle counter holds the new second counter value of 3. Since the condition of step S200 is true because the end of instruction signal is on a high logic level, the monitor unit 20 removes the oldest queue element, i.e., the second queue element, from the monitor queue 70 in step S210 and compares the second queue element with the trap elements of the trap file 50 in step S212. Since the second queue element does not match with the trap elements of table 2, the matching result of step S212 is not true. As a result, the monitor unit 20 creates only a second statistic case in step S230 and no second monitor case and sends the second statistic case to the statistic file 80 in step S232. After the thirteenth cycle 13, the second instruction SUB also is removed from the execution unit 18. In sum, in the thirteenth simulation cycle 13, the second queue element with the second op-code 0xF and the new second counter value 3 is removed from the monitor queue 70.

In a fourteenth simulation cycle 14, there is no relevant interface activity, and the test file 50 is stopped. The monitor unit sends the monitor file 80, which contains the first monitor case, to the monitor database 92 and also sends the statistic file 80, which contains the first and second statistic cases, to the statistic database.

In sum, the first monitor case was collected due to the first trap element matching for the execution of the first instruction ADD.

Moreover, the simulation run produced the statistic cases shown in table 3, which were sent to the statistic database 90 at the end of the simulation run.

TABLE 3

| Instruction identifier | Number of execution cycles | Number of occurrences |
|---|---|---|
| ADD | 4 | 1 |
| SUB | 3 | 1 |

In the described exemplary embodiment of the invention, the monitor unit is active during every cycle of the simulation run. In the shown implementation, each encountered case is collected in the monitor file and/or in the statistic file and sent to a monitor database and/or a statistic database at the end of the simulation run. Other implementations not shown can send the encountered monitor cases and statistic cases directly to the corresponding database for updating and storage.

The invention can take the form of an embodiment with only hardware elements, an embodiment with only software elements, or an embodiment containing both hardware and software elements. In an exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any other instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Current examples of computer-readable media include a semiconductor or solid state memory, magnetic tape, a removable computer diskette, a random access memory (RAM), a read-only memory (ROM), a rigid magnetic disk, and an optical disk. Current examples of optical disks include compact disc-read only memory (CD-ROM), compact disc-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are examples of the currently available types of network adapters.

REFERENCE LIST

10 Processor Simulation Model
12 Instruction Unit
14 Load Store Unit
16 Fixed Point Unit
18 Floating Point Unit
20 Monitor Unit
25 Control Unit
26 Comparator
30 Monitor File
32, 32' Monitor Case
40 Trap File
41, 41' Trap Element
42 Instruction Identifier
42' Placeholder
43, 43' Regular Expression
44, 44' Relational Operator
45, 45' Logical Operator
47, 47' Number of Execution Cycles
50 Test File
52, 52' Test Case
54, 54' Instruction Identifier
56, 56' Input Data
60 Simulation Environment
62 Application Program Interface (API)
70 Monitor Queue
72, 72' Queue Element
74, 74' Execution Cycle Counter
76, 76' Oldest Queue Element
78, 78' Number of Execution Cycles
80 Statistic File
82, 82' Statistic Case
84, 84' Number of Occurrences
90 Statistic Database
92 Monitor Database
123 Op-Code

The invention claimed is:

1. A method of verifying a processor design using a processor simulation model in a simulation environment, wherein said processor simulation model comprises at least one execution unit for executing at least one instruction of a test file, said method comprising:

tracking each execution of each of said at least one instruction by creating a monitor queue with a queue element for each instruction currently being executed, wherein each queue element holds instruction information including (i) an instruction identifier that identifies a type of a corresponding instruction and (ii) an execution cycle counter that holds a counter value indicating a number of execution cycles that the corresponding instruction has executed up to the current point in time;

monitoring relevant signals in each execution cycle, wherein said relevant signals include at least one of an instruction issue valid signal, an instruction stall signal, an instruction kill/flush signal, and an end of instruction signal;

upon determining that said instruction issue valid signal is active, creating a new queue element in said monitor queue;

upon determining that said instruction stall signal is active, holding constant current counter values of said execution cycle counters for said queue elements in said monitor queue;

upon determining that said instruction kill/flush signal is active, removing corresponding queue elements from said monitor queue;

upon determining that said end of instruction signal is active, removing the oldest queue element from said monitor queue, and comparing the instruction information held by said oldest queue element against a set of trap elements included in a trap file; and upon determining that said oldest queue element matches a trap element in said set of trap elements, collecting the instruction information held by said oldest queue element in a monitor file.

2. The method of claim 1, further comprising:
collecting the instruction information held by said oldest queue element in a statistic file.

3. The method of claim 2, wherein collecting the instruction information held by said oldest queue element in said statistic file comprises:
creating a statistic case comprising the instruction information held by said oldest queue element and a number of occurrences of a statistic case type; and
sending said statistic case to said statistic file.

4. The method of claim 1, wherein the counter value of the execution cycle counter held by each queue element in said monitor queue is increased in response to each execution cycle during execution of the corresponding instruction.

5. The method of claim 1, wherein collecting the instruction information held by said oldest queue element in said monitor file comprises:
creating a monitor case comprising the instruction information held by said oldest queue element and a current test case of said test file, wherein the current test case comprises the instruction identifier held by said oldest queue element and corresponding input data; and
sending said monitor case to said monitor file.

6. The method of claim 1, wherein each trap element in said set of trap elements comprises at least one of an instruction identifier and a placeholder, and further comprises a regular expression which is either empty or comprises a relational operator, a corresponding number of execution cycles, and a logical operator.

7. A system of verifying a processor design using a processor simulation model in a simulation environment, wherein said processor simulation model comprises at least one execution unit for executing at least one instruction of a test file, said system comprising a monitor unit with a control unit using an interface to communicate with said processor simulation model, wherein said monitor unit is configured to:
- track, by operation of one or more hardware elements, each execution of each of said at least one instruction by creating a monitor queue with a queue element for each instruction currently being executed, wherein each queue element holds instruction information including (i) an instruction identifier that identifies a type of a corresponding instruction and (ii) an execution cycle counter that holds a counter value indicating a number of execution cycles that the corresponding instruction has executed up to the current point in time;
- monitor relevant signals in each simulation cycle, wherein said relevant signals include at least one of an instruction issue valid signal, an instruction stall signal, an instruction kill/flush signal, and an end of instruction signal;
- in response to said instruction issue valid signal being active, create a new queue element in said monitor queue;
- in response to said instruction stall signal being active, hold constant current counter values of said execution cycle counters for said queue elements in said monitor queue;
- in response to said instruction kill/flush signal being active, remove corresponding queue elements from said monitor queue;
- in response to said end of instruction signal being active, remove the oldest queue element from said monitor queue, and compare the instruction information held by said oldest queue element against a set of trap elements included in a trap file; and
- in response to said oldest queue element matching a trap element in said set of trap elements, collect the instruction information held by said oldest queue element in a monitor file.

8. The system of claim 7, wherein said monitor unit is further configured to collect the instruction information held by said oldest queue element in a statistic file.

9. The system of claim 8, wherein said monitor unit is further configured to:
- create a statistic case comprising the instruction information held by said oldest queue element and a number of occurrences of a statistic case type; and
- send the statistic case to said statistic file.

10. The system of claim 7, wherein said monitor unit is further configured to increase the counter value of the execution cycle counter held by each queue element in said monitor queue in response to each execution cycle during execution of the corresponding instruction.

11. The system of claim 7, wherein said monitor unit is further configured to:
- create a monitor case comprising the instruction information held by said oldest queue element and a current test case of said test file; and
- send said monitor case to said monitor file.

12. A system comprising:
- a processor; and
- a memory storing a program, which, when executed on the processor, performs an operation of verifying a processor design using a processor simulation model, wherein said processor simulation model comprises at least one execution unit for executing at least one instruction of a test file, said operation comprising:
  - tracking each execution of each of said at least one instruction by creating a monitor queue with a queue element for each instruction currently being executed, wherein each queue element holds instruction information including (i) an instruction identifier that identifies a type of a corresponding instruction and (ii) an execution cycle counter that holds a counter value indicating a number of execution cycles that the corresponding instruction has executed up to the current point in time;
  - monitoring relevant signals in each execution cycle, wherein said relevant signals include at least one of an instruction issue valid signal, an instruction stall signal, an instruction kill/flush signal, and an end of instruction signal;
  - upon determining that said instruction issue valid signal is active, creating a new queue element in said monitor queue;
  - upon determining that said instruction stall signal is active, holding constant current counter values of said execution cycle counters for said queue elements in said monitor queue;
  - upon determining that said instruction kill/flush signal is active, removing corresponding queue elements from said monitor queue;
  - upon determining that said end of instruction signal is active, removing the oldest queue element from said monitor queue, and comparing the instruction information held by said oldest queue element against a set of trap elements included in a trap file; and
  - upon determining that said oldest queue element matches a trap element in said set of trap elements, collecting the instruction information held by said oldest queue element in a monitor file.

13. The system of claim 12, wherein said operation further comprises:
- collecting the instruction information held by said oldest queue element in a statistic file.

14. A non-transitory computer-usable storage medium storing an application which, when executed on a processor, performs an operation of verifying a processor design using a processor simulation model, wherein said processor simulation model comprises at least one execution unit for executing at least one instruction of a test file, said operation comprising:
- tracking each execution of each of said at least one instruction by creating a monitor queue with a queue element for each instruction currently being executed, wherein each queue element holds instruction information including (i) an instruction identifier that identifies a type of a corresponding instruction and (ii) an execution cycle counter that holds a counter value indicating a number of execution cycles that the corresponding instruction has executed up to the current point in time;
- monitoring relevant signals in each execution cycle, wherein said relevant signals include at least one of an instruction issue valid signal, an instruction stall signal, an instruction kill/flush signal, and an end of instruction signal;

upon determining that said instruction issue valid signal is active, creating a new queue element in said monitor queue;

upon determining that said instruction stall signal is active, holding constant current counter values of said execution cycle counters for said queue elements in said monitor queue;

upon determining that said instruction kill/flush signal is active, removing corresponding queue elements from said monitor queue;

upon determining that said end of instruction signal is active, removing the oldest queue element from said monitor queue, and comparing the instruction information held by said oldest queue element against a set of trap elements included in a trap file; and upon determining that said oldest queue element matches a trap element in said set of trap elements, collecting the instruction information held by said oldest queue element in a monitor file.

15. The non-transitory computer-usable storage medium of claim 14, wherein said operation further comprises:

collecting the instruction information held by said oldest queue element in a statistic file.

* * * * *